United States Patent
Eifflaender et al.

(10) Patent No.: US 9,011,748 B2
(45) Date of Patent: Apr. 21, 2015

(54) PLASTIC COMPONENT WITH A COMPLEX AND BIFURCATED STRUCTURE

(75) Inventors: Thomas Eifflaender, Friedrichshafen (DE); Daniel Wolf, Friedrichshafen (DE); Jens Heimann, Stetten (DE)

(73) Assignee: ZF Friedrichshafen AG, Fredrichshafen (DE)

( * ) Notice: Subject to any disclaimer, the term of this patent is extended or adjusted under 35 U.S.C. 154(b) by 337 days.

(21) Appl. No.: 13/477,453

(22) Filed: May 22, 2012

(65) Prior Publication Data

US 2012/0315433 A1 Dec. 13, 2012

(30) Foreign Application Priority Data

Jun. 10, 2011 (DE) .......................... 10 2011 077 337

(51) Int. Cl.
| | | |
|---|---|---|
| B29C 70/44 | (2006.01) | |
| B29C 70/34 | (2006.01) | |
| B29C 33/48 | (2006.01) | |

(52) U.S. Cl.
CPC ............. *B29C 70/345* (2013.01); *B29C 33/485* (2013.01)

(58) Field of Classification Search
CPC .... B29C 70/44; B29C 70/446; B29C 70/345; B29L 2031/3055; B29L 2031/3064; B29L 2031/75; B29L 2031/7502; B29L 2031/774
USPC ........ 264/258; 425/125, 129.1, 408, 412, 422
See application file for complete search history.

(56) References Cited

U.S. PATENT DOCUMENTS

| | | | | |
|---|---|---|---|---|
| 2,369,636 | A | * | 2/1945 | Bacon ........................... 264/258 |
| 4,583,933 | A | * | 4/1986 | Woelfel et al. ................. 425/330 |
| 5,047,106 | A | * | 9/1991 | Matsumoto et al. ........... 156/169 |
| 5,296,065 | A | * | 3/1994 | Greatorex ...................... 156/196 |
| 5,759,592 | A | * | 6/1998 | Piramoon et al. ............. 425/414 |
| 8,652,380 | B2 | * | 2/2014 | Lew et al. ...................... 264/258 |
| 2002/0066973 | A1 | | 6/2002 | Visconti et al. |
| 2005/0127566 | A1 | | 6/2005 | Chotard |
| 2008/0115555 | A1 | * | 5/2008 | Depase et al. ................... 72/343 |
| 2010/0013119 | A1 | * | 1/2010 | Meggiolan et al. ......... 264/271.1 |
| 2012/0313339 | A1 | * | 12/2012 | Heimann et al. ....... 280/124.116 |

FOREIGN PATENT DOCUMENTS

| | | |
|---|---|---|
| DE | 10 2007 041 431 A1 | 3/2009 |
| EP | 1 547 756 A1 | 6/2005 |
| EP | 2 014 437 A1 | 1/2009 |
| WO | 03/068472 A1 | 8/2003 |
| WO | 2009/114577 A2 | 9/2009 |

* cited by examiner

*Primary Examiner* — Robert B Davis
(74) *Attorney, Agent, or Firm* — Davis & Bujold, PLLC; Michael J. Bujold

(57) ABSTRACT

A die for producing pressed, fiber-reinforced plastic components, as well as a method for producing the plastic component, and the plastic component itself. The plastic components comprising at least two structural parts which overlap one another a pressing direction such that the die comprises at least one upper die portion formed with a pressing unit for applying a pressing force in the pressing direction, and at least one lower die portion which cooperates with the upper die portion to form a cavity in which the plastic component is formed. A die insert is fitted in the die and can move by and with the upper die portion and is designed to transmit the pressing force to the at least one structural part of the plastic component which is overlapped by the other structural part of the plastic component in the pressing direction.

23 Claims, 6 Drawing Sheets

Fig. 2.1A
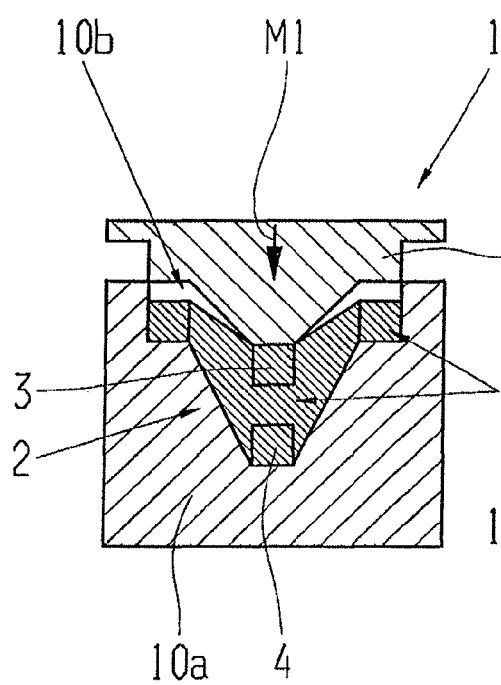
Fig. 2.2A
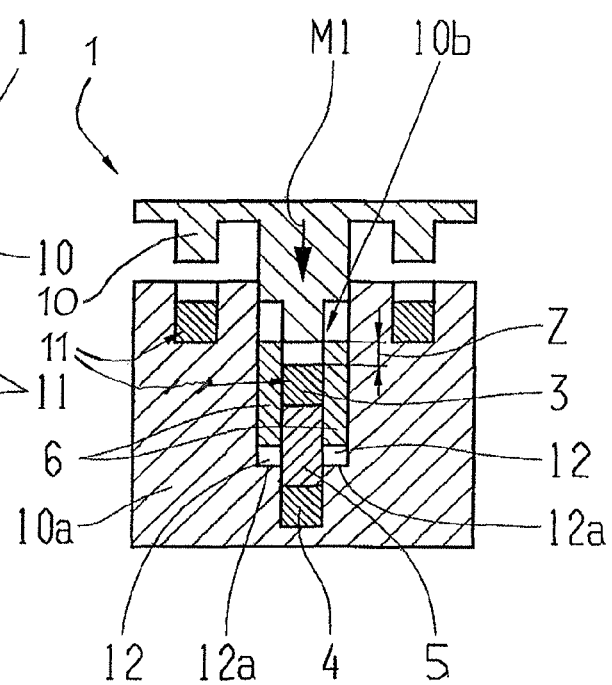
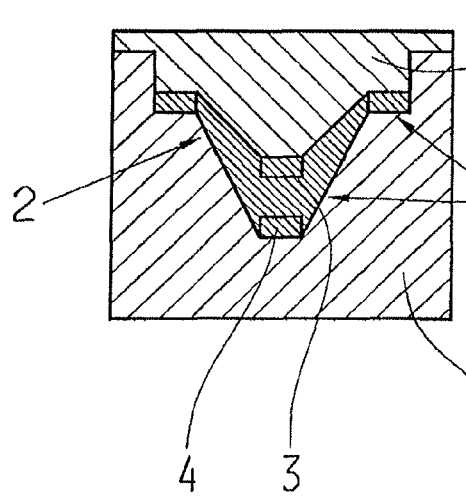
Fig. 2.1b
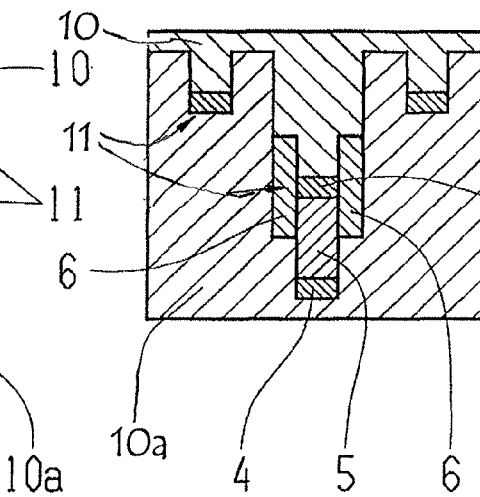
Fig. 2.2b

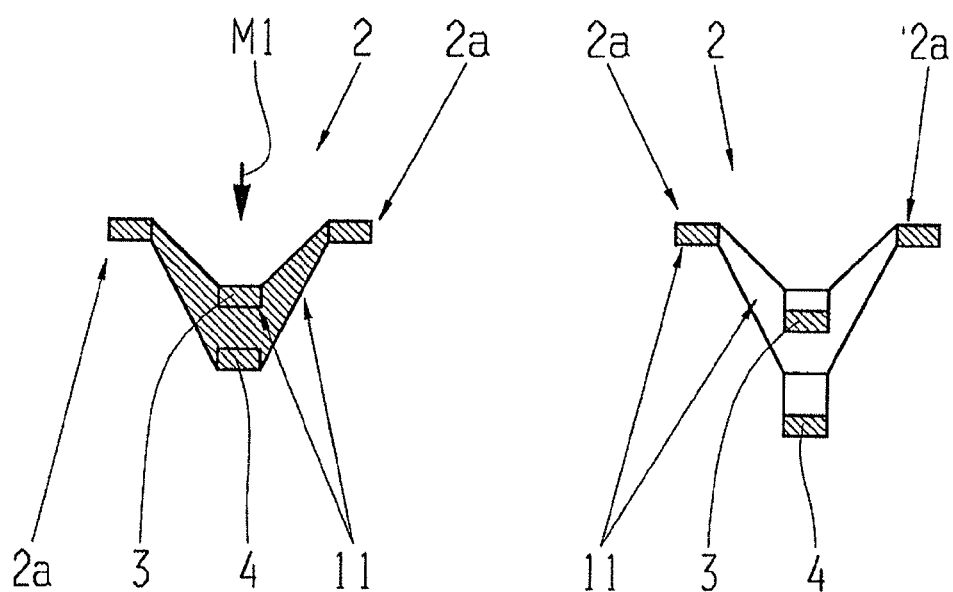
Fig. 6.1    Fig. 6

PLASTIC COMPONENT WITH A COMPLEX AND BIFURCATED STRUCTURE

This application claims priority from German patent application serial no. 10 2011 077 337.1 filed Jun. 10, 2011.

FIELD OF THE INVENTION

The present invention concerns a die for the production of pressed, fiber-reinforced plastic components, a method for producing such components by means of the die according to the invention, and a plastic component with fiber reinforcement.

BACKGROUND OF THE INVENTION

Development departments in industry, especially the automotive industry, are intensifying their search for possible ways to provide components of low weight at the same time as improved or at least equally good performance and favorable cost characteristics.

From the prior art various methods are already known for producing pressed, fiber-reinforced plastic components, particularly for use in motor vehicles, all of which have in common that to consolidate and connect the fiber layers, pressure has to be applied by pressing from the outside. However, the methods of the prior art have the disadvantage that complex, branching structures with sections of the structures that overlap in the pressing direction demand high cost and effort (slider techniques with separate control mechanisms) for the dies required, or entail the provision of cores. Since the position of a core can often not be defined exactly from outside, there is a risk that different wall thicknesses or undefined geometrical configurations may be produced. Alternatively complex components with undercuts are avoided, particularly when using thermosetting plastic resin systems, because slider techniques or multi-component dies require elaborate sealing due to the low viscosity of the resin and cannot be operated reliably for mass production, since in time the resin clogs up the movement mechanisms of the sliders.

SUMMARY OF THE INVENTION

The purpose of the present invention is to develop further a die for the production of pressed, fiber-reinforced plastic components, the associated production method, and the plastic component itself, in such manner that even complex, branching structures and overlapping structure sections can be produced with less cost and effort compared with the previously known prior art.

The die according to the invention for producing pressed, fiber-reinforced plastic components, the plastic components, having at least two sections of their structure which overlap at least partially in a pressing direction, comprises at least one upper die portion constructed with a pressing unit for applying a pressing force in the pressing direction. The die also comprises at least one lower die portion, which lower die portion co-operates with the upper die portion to form a cavity, wherein the plastic component is formed. The die according to the invention is characterized in that at least one movable, die insert is fitted in the die which can be moved along with and by the upper die portion and which is designed and provided so as to pass on the pressing force to the at least one of the structure sections of the plastic component which, in the pressing direction, is at least partially overlapped by the other structure section of the plastic component.

Consequently, the die according to the invention is able, by virtue of the die insert, to transmit the pressing force to a section of the structure which is overlapped in the pressing direction. This one structure section is at least partially overlapped by the at least one other structure section located between the upper die portion and the die insert. This means that the pressing force is transmitted by a plurality of structure sections, making it possible to produce pressed, fiber-reinforced plastic components that have a very complex structure.

A preferred embodiment of the die according to the invention provides that the die insert is positioned at least partially or in a section between the two structure sections in the pressing direction. The die insert serves to transmit the pressing force to at least one further section of the component's structure, in a simple and direct manner.

Advantageously, the die insert is mounted and able to move on the lower die portion. In the context of the invention the terms upper die portion and lower die portion are not to be understood as restrictive in relation to spatial orientation or arrangement. Consequently, it is possible for the upper die portion to be positioned spatially below the lower die portion and conversely, or for the die to be arranged horizontally.

A preferred embodiment of the die according to the invention is characterized in that the die insert can be moved passively along with the upper die portion. Consequently, there is no need for elaborate and/or malfunction-prone active moving of additional structural elements. Such actively moved structural elements are, in the prior art, for example the already mentioned sliders which are moved by their own individual control mechanism. Such complex slider techniques, which make severe demands on the sealing of the insert guides, are thus not needed according to the invention. Furthermore, no cores are needed for the formation of hollow spaces and/or undercuts. By virtue of the existing means for moving the upper die portion, the die insert can be carried with it in a purely passive manner. The omission of more extensive structural elements reduces total costs in relation to the production of the components and extends the useful life of the die.

In another further development, the die according to the invention advantageously provides a guide or guiding device for the die insert, the guide preferably being arranged on the lower die portion. The guide serves to align and guide the die insert. This enables the production of components with the same dimensions and contributes toward the reproducibility of the process.

The guides can be profiled, the shape of the corresponding guide profile being any shape desired. They are preferably orientated essentially parallel to the pressing direction, although certain deviations from this may be desired, as described in more detail below.

In another further development the guiding device is the form of a guide plate which extends over at least a part-section of the length of the die insert. In particular the guide plate provides an alternative to the guiding profile mentioned earlier. It can extend over the full length of the die insert, or only over a part-section thereof.

Another preferred embodiment of the die according to the invention is characterized in that the guide plate has at least one insertion-edge seal, this insertion-edge seal being located between the cavity and the die insert in the operating condition. The seal prevents the penetration of foreign bodies into the cavity or the escape of fluid material.

Advantageously, the die according to the invention is characterized in that stop abutments are provided for limiting movement of the die insert, preferably in or on the aforesaid guide or guiding device. Particularly in the case of a displacement-controlled approach of the die, the stops enable fixed, defined structural component geometry to be obtained. This enables the production process and the geometry of the components to be controlled precisely and reproducibly.

Advantageously, in another further development of the invention, a slit-shaped injection aperture is provided between the cavity and the die insert, which is preferably designed and provided for injecting the plastic resin. Thanks to the slit between the cavity and the die insert, the resin can be injected in the manner of a linear jet. Advantageously, for this purpose a flow channel for point injection can be provided in the parting plane of the cavity between the upper and the lower die portion. In this way the die insert can distribute the plastic resin injected at a point, and no flushing aside or displacement of the fibers takes place at the injection point in the sense of "fiber washing". Thereby, linear injection takes place along the parting plane.

In another advantageous design of the die according to the invention at least one complementary recess is provided for the guiding device in at least one of the die portions, preferably the lower die portion. In one of the die portions, preferably the lower die portion, a corresponding groove adapted to the shape of the guiding device can be provided.

Advantageously, the guiding device or the complementary recess is arranged in this area offset approximately by a compression dimension of the component to be produced in the direction opposite to the pressing direction. The compression dimension is the dimension by which the fiber structure is compressed during the pressing process. Accordingly, in the area of the fibers laid in the die, no groove or no corresponding guiding profile is provided, which could affect the shape disadvantageously. Such a design of the guiding device avoids any negative influence upon the shape of the structural sections of the plastic component. Furthermore, an upward projecting rim of the guiding device of the die insert enables the fibers to be fixed and prevents them from sliding out of position. Moreover, the die insert itself can be actuated in a controlled manner and possible disadvantageous relative movement between the guiding device and the die insert can be avoided.

A preferred further development of the die according to the invention is characterized in that the die insert has a lateral obliquity and/or, relative to the pressing direction, an oblique guide in order to produce an additional pressing force directed essentially perpendicularly to the pressing direction.

Advantageously, another further development of the die according to the invention is characterized by an ejector unit for the die insert. In particular this can be designed to eject the die insert in parallel with the opening of the upper die portion. In particular, the upward-projecting guiding device can be coupled with interlock and/or by friction to the upper die portion and is thereby extracted or ejected when the upper die portion is opened. The coupling can be produced with interlock, for example by means of a screw joint, or by friction, for example by a magnetic coupling. In this way additional structural elements can consistently be omitted. A smaller number of structural elements reduces the complexity of the die and increases its life. The production process as a whole is therefore made simpler and less costly.

An also preferred embodiment of the die according to the invention provides that to modify the pressing force, between the cavity and the die insert and/or between the upper die portion and the die insert, a force element is provided, preferably at least one of the elements: spring, damper, pneumatic piston, hydraulic piston. This enables the pressing force to be selectively and individually adapted to suit the process or material conditions at the time.

Advantageously, as a further development of this idea the plastic resin to be injected is itself used as the medium for the force element, the plastic resin to be injected being admitted by way of at least one injection duct and/or at least one injection slot. In particular, the above-mentioned damper element or the hydraulic piston can contain the plastic resin to be injected as the medium.

Advantageously, the pressing force can be modified in a controlled manner by the throttle action of the injection duct and/or the injection slot. This allows a controlled adaptation of the pressing force to the process conditions, as described earlier.

A comparable preferred embodiment of the die according to the invention provides that between the force element on the one hand and the press unit itself or a further force element arranged on the press unit, a shiftable functional connection is arranged. In this case the force element or drive of the press unit is preferably in the form of a hydraulic piston. Advantageously, a spring is provided to produce a restoring force on the force element in the form of a piston and/or on the press unit comprising a piston.

Advantageously, the die according to the invention comprises passive linkages or levers, and/or electrically actuated means, for preferably hydraulic action on the force element formed as a piston and/or the press unit comprising a piston.

Advantageously, contactless displacement sensors are provided, which are arranged between the die insert and the cavity, preferably in the area of the stops. These displacement sensors can for example be in the form of inductive or magnetostrictive sensors. The displacement sensors serve for monitoring the process or the switching of the hydraulic piston during force-controlled closing of the cavity.

The method according to the invention for producing pressed, fiber-reinforced plastic components, the plastic components having at least two structure sections which at least partially overlap in a pressing direction, is characterized in that the component is produced by means of a die according to the invention, in such manner that first a number of fiber layers for forming at least the part of the structure that is lower in the pressing direction are placed in the cavity, and then the at least one die insert is inserted into the cavity and the building up of fiber layers in the cavity is continued, after which the pressing force for producing the component is applied. Thus, the method serves to produce a pressed, fiber-reinforced plastic component using the die described earlier.

The plastic component with fiber reinforcement according to the invention, in particular for use in a motor vehicle, comprising a plurality of fiber layers joined to one another by the injection of plastic and the action of a pressing force, is characterized in that the plastic component has at least two parts of its structure which overlap at least partially in a first direction, and the plastic component has at least one connecting portion that connects the two structure parts to one another, such that the component contains first fibers arranged approximately parallel to a first fiber orientation and the component contains second fibers arranged approximately parallel to a second fiber orientation, the second fiber orientation being different from the first fiber orientation, and such that the second fibers connect the parts of the structure to one another in a connecting portion.

Advantageously, as a further development the plastic component is designed such that the first fiber orientation is essentially perpendicular to the second fiber orientation. With fibers or fiber layers arranged in this manner relatively high fiber volume contents can be achieved.

The fiber layers can be arranged both outside the die and inside the die itself, to produce a so-termed textile preform.

However, in a process-technologically simpler and more advantageous manner the die insert allows the building up of the textile preform to be done directly inside the die, particularly when a Resin Transfer Molding (RTM) method is used to produce the component. As soon as the first fibers have been laid in position, which first fibers will subsequently at least be overlapped by fibers or fiber layers of other parts of the structure, the die insert can be inserted into the die. Then the layering of the fibers is continued. In this way even plastic components with more than two overlapping parts of the structure can be produced by repeated positioning of corresponding die inserts. For medium-sized production runs, by using the present invention the use of a preforming die is consequently replaced by using the die according to the invention.

The individual fiber layers can be untreated (unconsolidated) as well as pre-consolidated by a binder and/or by related methods when used in the context of the invention to build up the preform.

As suitable materials, laminar textiles such as tissues or layered fabrics, or even rovings laid in rows can be considered.

A preferred embodiment of the plastic component according to the invention provides that the plastic component is designed as a supporting structure, in particular a motor-vehicle supporting structure with integrated spring links, such that the parts of the structure form the spring links. The use of such plastic components as elements of a wheel suspension in a motor vehicle makes it possible to provide for the automotive industry complex structural elements of almost any desired shape, adapted to special motor vehicle structures and performance needs.

BRIEF DESCRIPTION OF THE DRAWINGS

Further advantages and characteristics emerge from the following example embodiments and the figures, which show:

FIG. 2.1A, 2.2A: The die according to the invention shown in FIG. 1, viewed in cross-section in a first position and in an initial condition of the pressing process;

FIG. 2.1B, 2.2B: The die according to the invention shown in FIG. 1, viewed in cross-section in a second position and in a final condition of the pressing process;

FIG. 6, 6.1: The plastic component of FIG. 5, viewed in cross-section in two positions.

DETAILED DESCRIPTION OF THE PREFERRED EMBODIMENTS

Figure 1:
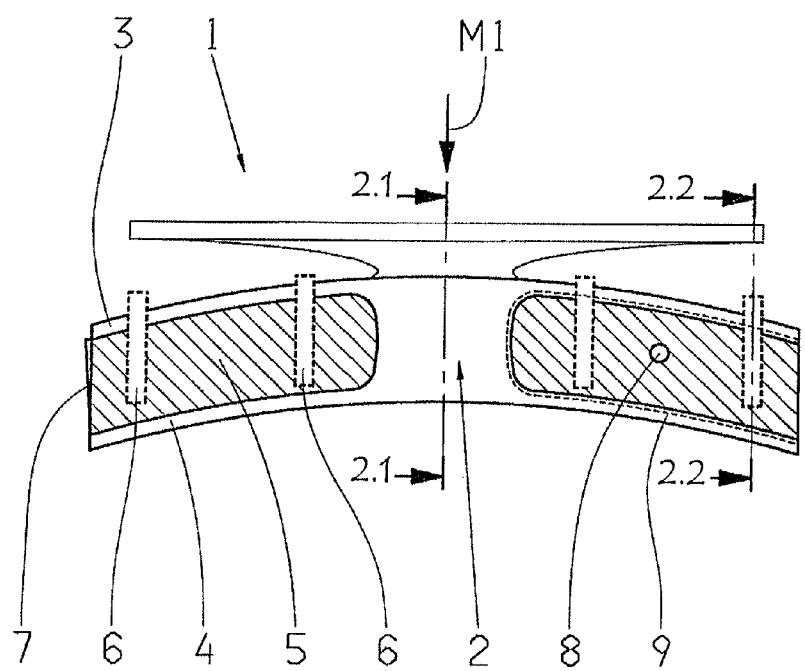
FIG. 1: An embodiment of the die according to the invention.

FIG. 1 shows an embodiment of the die 1 according to the invention for producing a plastic component 2, which has a complex structure with parts 3, 4 of the structure partially overlapping in the direction of the arrow M1. The direction M1 is the pressing direction, in which a press unit (not shown) acts upon the plastic component 2 in order to shape the plastic component 2.

Between the two parts 3, 4 of the structure is arranged a die insert 5. The die insert 5 is fitted so as to move, guided by guides 6. These guides 6 are orientated parallel to the pressing direction M1.

In its edge area the die insert 5 has an oblique surface 7 which, when the die insert moves in the pressing direction M1, produces an inward force perpendicular to the pressing direction M1 (toward the line 2.1-2.1).

Furthermore, there is an injection point 8 into which the required liquid material (resin) can be injected to produce the plastic component 2. The parting plane between the die insert 5 and the cavity (not shown in FIG. 1), in which cavity the plastic component 2 is formed, serves as the injection line for the liquid material.

FIGS. 2.1A, 2.2A show the initial condition of the pressing process and FIGS. 2.1B, 2.2B show its final condition. FIGS. 2.1A, 2.1B show the section 2.1-2.1 of the plastic component 2 of FIG. 1, whereas FIGS. 2.2A, 2.2B show the section 2.2-2.2 of the plastic component 2 of FIG. 1.

FIGS. 2.1A, 2.1B, 2.2A, 2.2B show the configuration of the die 1 according to the invention of FIG. 1, comprising an upper die portion 10 and lower die portion 10a between which the cavity 10b already mentioned is formed. In the die are laid fiber layers 11, which in the initial condition 2.1A, 2.2B of the pressing process are in an uncompressed state. In the final condition 2.2 of the pressing process the fiber layers, at least in the areas framed by squares or rectangles, have been compressed by about half their initial depth.

The FIGS. 2.1A, 2.2B show the massive structure in the central area of the plastic component 2 from FIG. 1, which is here also called the connecting area.

FIGS. 2.2A, 2.2B show the branched area of the plastic component 2 with the parts 3 and 4 of the structure that overlap in the direction M1, wherein according to a preferred use of the component 2 the parts 3, 4 of the structure that overlap in the direction M1, can also be termed spring links. The die 1 has a groove 12 in which the guiding element 6 is arranged and able to move. In the final condition of the pressing process shown in FIG. 2.2A the guiding element 6 has reached a lower end-stop 12a of the groove 12 (see FIG. 2.2A).

At the upper die portion 10 is brought down the upper die portion 10 exerts pressure in the direction of the arrow M1 on the fiber arrangements 11 described above and compresses them to produce the plastic component 2, as can be seen by comparing FIGS. 2.1A, 2.1B and 2.2A, 2.2B. Moreover, the upper die portion 10 moves the guiding elements 6 within the grooves 12 and—indirectly by way of the upper part 3 of the structure in the pressing direction M1—the die insert 5, which for its part exerts a passive pressure on the lower part 4 of the structure in the pressing direction M1.

It can also be seen in FIG. 2.2A that the guiding elements 6 project upward by a certain distance relative to the fiber layers 11 of the structure part 3 to be compressed. By virtue of the special design of the upper die portion in its pressing part that faces toward the cavity 10b, first the fiber layers 11 are compressed in the area of the parts 3, 4 of the structure, and then a farther compression of the plastic component 2 takes place in these areas along with a downward movement of the guiding elements 6 so that between the plastic component 2 and the guiding elements 6 there is a progressively decreasing relative movement until the guiding elements 6 encounter the end-stops 12a and the pressing process ends.

Figure 3:
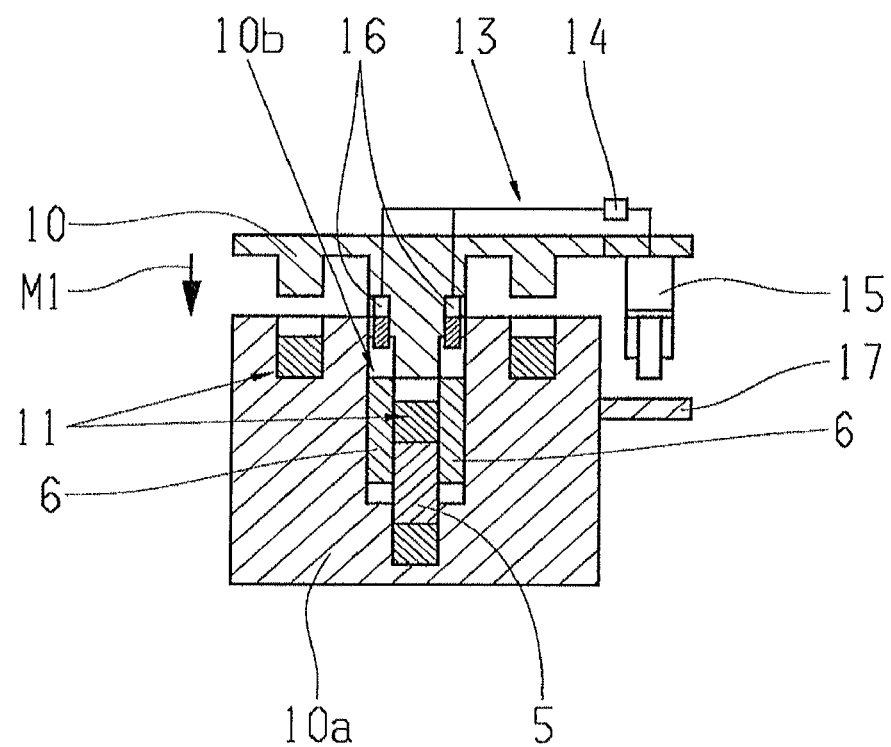
FIG. 3: An alternative embodiment of the die according to the invention shown in FIG. 2, with a shiftable functional connection for an additional force element.

FIG. 3 shows an embodiment of the die 1 according to the invention alternative to FIGS. 2.1A, 2.1B, 2.2A, 2.2B, with a shiftable functional connection 13 for an additional force element 14-17.

The force element comprises a switching device 14, for example a valve, two hydraulic pistons 15, 16 and an actuating structure in the form of a stop 17.

As the die is brought in, the pressing process can be monitored and controlled by virtue of the functional connection 13 or the force element 14-17. When the upper die portion 10 moves downward in the direction of the arrow M1 toward the lower die portion 10*a*, the hydraulic piston 15 interacts with the stop 17 and produces on the transmitting side (hydraulic piston 15) a pressure, which can be transmitted on the receiving side (hydraulic piston 16) to the guiding elements 6. The switching device 14 shown in FIG. 3 can in particular be in the form of an electrically controlled valve and can in this way selectively influence the above-described force action by means of the hydraulic piston 16.

Figure 4A:
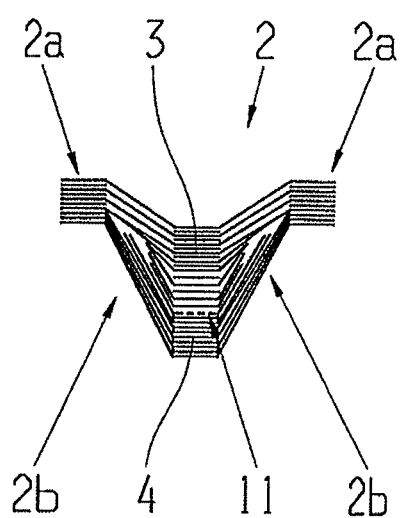
FIG. 4, 4A: schematic representations of the layering of fiber layers for a plastic component according to the invention.
Figure 4:
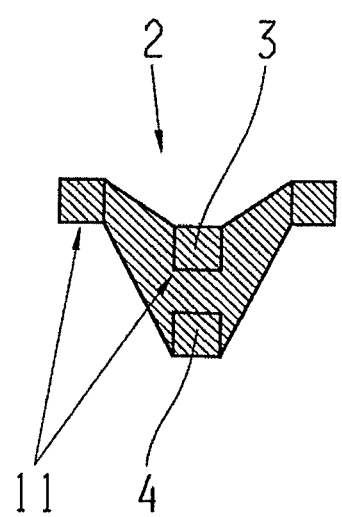

FIGS. 4, 4A illustrate the arrangement of the fiber layers 11 of a plastic component 2 according to the invention. The fiber layers 11 shown correspond to the representation of the plastic component 2 in FIGS. 2.1A, 2.2A, i.e. in the massive, central area (connecting area) of the plastic component 2. Particularly in the areas which merge into the already mentioned overlapping parts 3, 4 of the structure, the fiber layers 11 are on the one hand orientated longitudinally, and on the other hand they alternate with fiber layers 11 that extend transversely (from right to left and also obliquely from the top downward—or conversely) through the component. The same applies in the edge areas 2*a* of the plastic component 2, which also have fibers extending longitudinally and transversely. In contrast, in the connecting areas 2*b* the fiber layers 11 extend only transversely (and obliquely).

Figure 5:
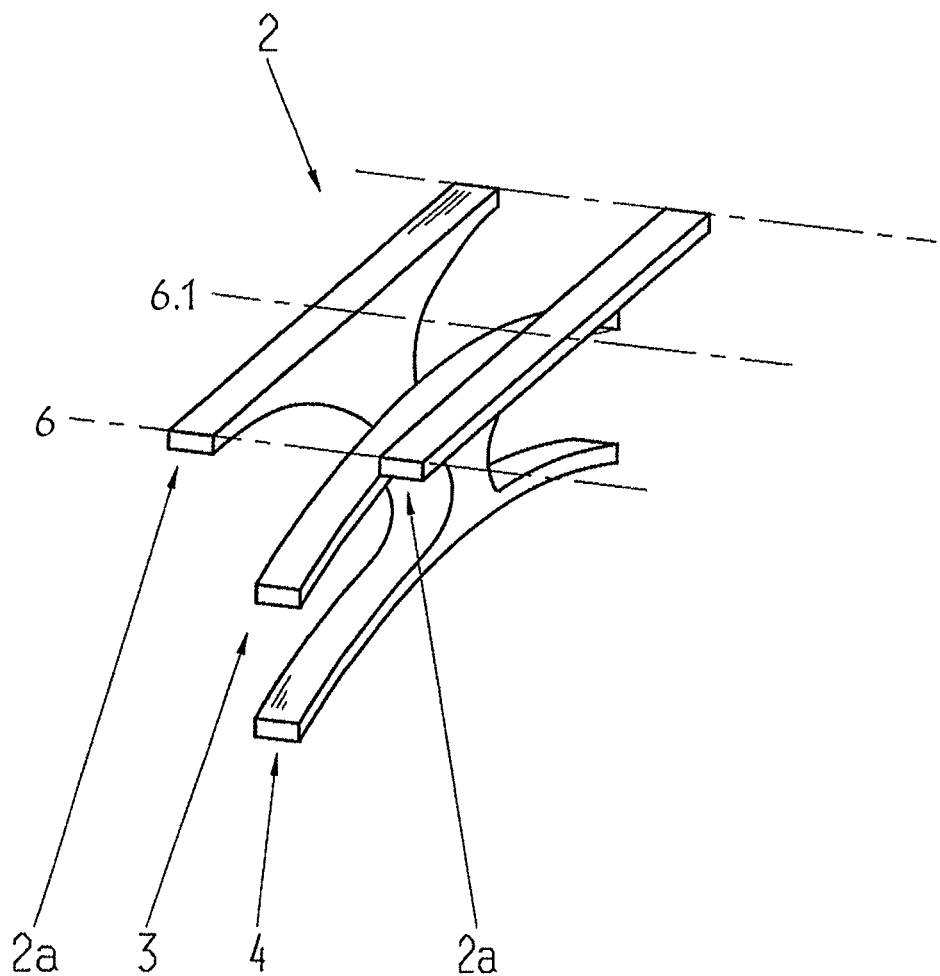
FIG. 5: An embodiment of the plastic component according to the invention, seen in an overall perspective view.

FIG. 5 shows a design of the plastic component 2 according to the invention, in which plastic component 2 two parts 3, 4 of the structure overlap. The plastic component forms a motor-vehicle supporting structure with integrated spring links formed by the parts 3, 4 of the structure, and is designed for use in a motor vehicle. Depending on the position (indexes 6.1, 6 in FIG. 5), the structure of the plastic component is massive or branched (see positions 2.1 and 2.2 in FIG. 1).

FIGS. 6, 6.1 show the plastic component according to the invention from FIG. 5 in cross-section at the positions shown in FIGS. 6.1 and 6. The position shown in FIG. 6.1, shows the cross-section of the plastic component in the middle thereof, at which position the structure of the plastic component is massive (see FIG. 2.1A). On the other hand the cross-section at the position shown in FIG. 6 shows an edge or outer area of the plastic component. Here the structure of the plastic component branches, since the parts 3, 4 of the structure overlap.

INDEXES

1 Die
2 Plastic component
3 Structure part
4 Structure part
5 Die insert
6 Guide
7 Oblique face
8 Injection point
9 Injection line
10 Upper die portion
10*a* Lower die portion
10*b* Cavity
11 Fiber layers
12 Groove
12*a* End-stop
13 Shiftable functional connection
14 Switching device
15 Piston
16 Piston
17 End-stop
M1 Movement direction, pressing direction

The invention claimed is:

1. A die (1) for producing pressed, fiber-reinforced plastic components (2) which comprise at least two parts (3, 4) of a structure which at least partially overlap in a pressing direction (M1), the die (1) comprising:
    an upper die portion (10) being formed with a pressing unit for applying a pressing force in the pressing direction (M1),
    at least one lower die portion (10*a*) cooperating with the upper die portion (10) for forming a cavity (10*b*),
    the plastic component (2) being formed in the cavity (10*b*),
    at least one die insert (5) being fitted in the die (1) and able to move, the at least one die insert (5) being moved by the upper die portion (10),
    the at least one die insert (5) being designed and provided for transmitting the pressing force to at least one of the at least two parts (3, 4) of the structural of the plastic component (2) which, in the pressing direction (M1), is at least partially overlapped by at least the other part (3, 4) of the structure of the plastic component (2).

2. The die according to claim 1, wherein the die insert (5) is arranged at least partially between the at least two parts (3, 4) of the structure in the pressing direction (M1).

3. The die according to claim 1, wherein the die insert (5) is movably fitted on the lower die portion (10*a*).

4. The die according to claim 1, wherein the die insert (5) is passively moved by and along with the upper die portion (10).

5. The die according to claim 1, wherein at least one guiding element for the die insert (5) is arranged on the lower die portion (10*a*).

6. The die according to claim 5, wherein the guiding element is a guide-plate which extends at least over part of a length of the die insert (5).

7. The die according to claim 6, wherein the guide-plate has at least one immersion-edge seal which, in an operating condition, is positioned between the cavity (10*b*) and the die insert.

8. The die according to claim 5 wherein end-stops are located either in or on the guiding element for limiting a movement of the die insert (5).

9. The die according to claim 1, wherein a slot-shaped injection aperture is provided, between the cavity (10*b*) and the die insert (5), to facilitate injection of plastic resin.

10. The die according to claim 9, wherein a flow channel is provided in a parting plane of the cavity (10*b*) between the upper die portion (10) and the lower die portion (10*a*) for point injection.

11. The die according to claim 5, wherein at least one complimentary guiding structure is formed on the lower die portion (10*a*).

12. The die according to claim 11, wherein the guiding structure is arranged offset by a compression distance of the component to be produced, in this area in the pressing direction (M1).

13. The die according to claim 1, wherein the die insert (5) has at least one of a lateral oblique face and a guide surface, which is oblique relative to the pressing direction (M1), for producing an additional pressing force perpendicular to the pressing direction.

14. The die according to claim 1, wherein at least one ejector unit biases the die insert parallel to an opening movement of the upper die portion (10).

15. The die according to claim 1, wherein the die insert is couplable to the upper die portion (10) by at least one of friction force and an interlock.

16. The die according to claim 1, wherein a force element is provided at least one of between the cavity (10b) and the die insert and between the upper die portion (10) and the die insert, the force element modifies the pressing force, and the force element is at least one of a spring, a damper, a pneumatic piston and a hydraulic piston.

17. The die according to claim 16, wherein a plastic resin to be injected is a medium for the force element, the plastic resin to be injected is introduced via at least one of an injection channel and an injection slot of the cavity (10b).

18. The die according to claim 17, wherein the pressing force is selectively adjusted by a throttle action of the at least one of the injection channel and the injection slot.

19. The die according to claim 16, wherein a controllable functional connection is arranged between the force element and either the pressing unit itself or a further force element arranged on the pressing unit for actuating the force element.

20. The die according to claim 1, wherein at least one spring element is provided for producing a restoring force on the force element in the form of a piston and the pressing unit comprising a piston.

21. The die according to claim 16, wherein at least one of links and levers, and an electrically actuated mechanism is arranged on the force element in the form of at least one of a piston and the pressing unit comprising a piston, to act hydraulically thereon.

22. The die according to claim 5, wherein at least one no-contact displacement sensor is arranged between the die insert and the cavity (10b), in the area of the end-stops.

23. A method of producing pressed, fiber-reinforced plastic components (2) comprising at least two structural parts (3, 4) which at least partially overlap one another in a pressing direction (M1), the component (2) is produced by a die (1, 10, 10a) comprising an upper die portion (10) formed with a pressing unit for applying a pressing force in the pressing direction (M1), and at least one lower die portion (10a) cooperating with the upper die portion (10) to form a cavity (10b), the plastic component (2) being formed in the cavity (10b), at least one die insert (5) is fitted in the die (1) able to move, the at least one die insert (5) being moved by the upper die portion (10), the at least one die insert (5) is designed to transmit the pressing force on to at least one structural part (3, 4) of the plastic component (2) which, in the pressing direction (M1), is at least partially overlapped by the other structural part (3, 4) of the plastic component (2), the method comprising the steps of:

placing in the cavity (10b) a number of fiber layers for forming at least the structural part (3, 4) which is lower in the pressing direction (M1);

inserting the at least one die insert (5) into the cavity (10b);

continuing building up of fiber layers within the cavity (10b); and applying the pressing force for producing the component (2).

* * * * *